United States Patent
Shenefelt et al.

(10) Patent No.: US 7,031,788 B2
(45) Date of Patent: Apr. 18, 2006

(54) R2V PACKAGING PROCESS AND SYSTEM

(75) Inventors: Robert D. Shenefelt, Seattle, WA (US); Gary L. Perkins, Camano Island, WA (US); Roxanne M. Fairfax, Everett, WA (US)

(73) Assignee: The Boeing Company, Chicago, IL (US)

( * ) Notice: Subject to any disclaimer, the term of this patent is extended or adjusted under 35 U.S.C. 154(b) by 374 days.

(21) Appl. No.: 10/427,687

(22) Filed: Apr. 30, 2003
(Under 37 CFR 1.47)

(65) Prior Publication Data
US 2004/0220692 A1 Nov. 4, 2004

(51) Int. Cl.
*G06F 19/00* (2006.01)

(52) U.S. Cl. .......... 700/117; 700/97; 700/182; 345/419; 206/102; 206/122

(58) Field of Classification Search ........ 345/419; 206/102, 122; 700/97, 117, 182
See application file for complete search history.

(56) References Cited
U.S. PATENT DOCUMENTS

| | | |
|---|---|---|
| 4,964,514 A | 10/1990 | Wycech |
| 5,409,560 A | 4/1995 | Hammer et al. |
| 5,511,153 A * | 4/1996 | Azarbayejani et al. ...... 345/419 |
| 6,654,653 B1 * | 11/2003 | Heneveld et al. ............. 700/97 |
| 6,807,451 B1 * | 10/2004 | Shida et al. .................. 700/97 |
| 2002/0120920 A1 * | 8/2002 | Jayaram et al. ............. 717/137 |

FOREIGN PATENT DOCUMENTS

| | | |
|---|---|---|
| DE | 102 19 038 | 7/2003 |
| EP | 0 645 309 A1 | 8/1994 |
| WO | WO 01/89930 A1 | 11/2001 |

\* cited by examiner

*Primary Examiner*—Leo Picard
*Assistant Examiner*—Douglas S. Lee
(74) *Attorney, Agent, or Firm*—Black Lowe & Graham, PLLC

(57) ABSTRACT

The present invention provides a method and system for creating customized packing for an item to be packed. An image of the item is created and an outline of the image is traced. The packing material is then cut to conform to the outline. In accordance with further aspects of the invention, the image is converted to an outline form by a raster-to-vector conversion. In further aspects of the invention, multiple outlines are configured in a packing configuration. The configurations may be edited and stored. In other aspects, manufacturing of customized packing for tools and tool kit management may be performed by the method of the current invention.

110 Claims, 14 Drawing Sheets

Create A Kit

| Kit Number | Test Kit | | Requestor's Name | Fred Smith | | |
|---|---|---|---|---|---|---|
| Creation Date | 1/31/2003 | | BEMS ID | 12345 | Org | G-6871 |
| Revision | 1 | Number of Kits | 1 | Phone Number | 425-477-4315 | |
| Kit Size (WxH) | 12 | 14 | Building/Column | 40-25 | M/C | 7H-08 |
| Foam Layers | 1 | | Tool Room Number | 835 | | |
| Program | ▶ | | Specific Application | Test | | |

Inventory

| Tool | Layout | Qty | Vector File |
|---|---|---|---|
| Flashlight - 2 Cell | Flat | 1 | flashlight001.cgm |
| Hammer - Compothane - 16oz | Flat | 1 | hammer001.cgm |
| Mirror - Oval pocket inspection | Flat | 1 | mirror001.cgm |
| Screwdriver - Racheting | Flat | 1 | screwdriver001.cgm |

— 306                    312 —

CREATE   CANCEL

R2V PACKAGING PROCESS AND SYSTEM

FIELD OF THE INVENTION

This invention relates generally to packing materials and, more specifically, to packing for tool kits.

BACKGROUND OF THE INVENTION

Items are often packed in containers for shipping and storage using customized packing. Such packing is often manufactured to conform to the items and to the containers in which the items are stored and/or shipped. In particular, customized tool kits are used in many industries to hold tools for specific applications and work. Such tool kits often include foam inserts or packing conformed to hold the tools contained in the kit. If a tool is missing or left behind, the absence of the tool in the packing makes it obvious to the user that a tool is missing. This is important for work in areas where foreign objects should not be left upon completion of the work.

Current systems size and configure the packing for tools in tool kits and items for packing using specific measurements of the objects. These measurements are typically taken on an individual basis by hand. Dimensions are taken manually from the objects themselves or read one at a time from computer aided design (CAD) drawings of the objects. Specific outline drawings for cutting the packing are then compiled by hand. The resulting outlines can be grouped manually, or used individually in designing and cutting the actual packing materials used to pack the objects. In current systems, after manufacture of the packing materials for an object, there is no convenient way to modify the packing configuration in the event of a change in the object being packed or in the event different objects are desired to be packed. Further, in organizations where multiple tool kits are packed and multiple tool kit configurations are utilized, it is typically difficult to obtain earlier generated packing outlines or packing configurations for use in subsequently made tool kits or container packing.

Thus, there is an unmet need in the art for automated generation of outlines and configurations for packing tools and items, and for editing, logging, and tracking configurations and related information after manufacture for later re-use or re-configuration.

SUMMARY OF THE INVENTION

Embodiments of the present invention provide a method and system for creating customized packing for an item to be packed. An image of the item is created, and an outline of the image is traced. The packing material is then cut or manufactured to conform to the outline. In accordance with further aspects of the invention, the image is converted to an outline form by a raster-to-vector conversion. In further aspects of the invention, multiple outlines are configured in a packing configuration. The configurations may be edited and stored. In other aspects, manufacturing of customized packing for tools and tool kit management may be performed by the method of the current invention.

The present invention allows new tool kits and packing to be readily configured and manufactured. The present invention also allows existing tool kits and packing designs to be reconfigured. It further permits the tracking and inventorying of customized tool kits.

BRIEF DESCRIPTION OF THE DRAWINGS

The preferred and alternative embodiments of the present invention are described in detail below with reference to the following drawings.

FIG. 12 is a create a kit screen shot of a tool kit design and management computer application of the present invention;

DETAILED DESCRIPTION OF THE INVENTION

By way of overview, an exemplary embodiment of the present invention provides a method for creating customized packing for an item to be packed. An image of the item is created and an outline of the image is traced. The packing material is then cut or manufactured to conform to the outline. In accordance with further aspects of the invention, the image is converted to an outline form by a raster-to-vector conversion. In further aspects of the invention, multiple outlines are configured in a packing configuration. The configurations may be edited and stored. In other aspects, manufacturing of customized packing for tools and tool kit management may be performed by the method of the current invention.

Figure 1:
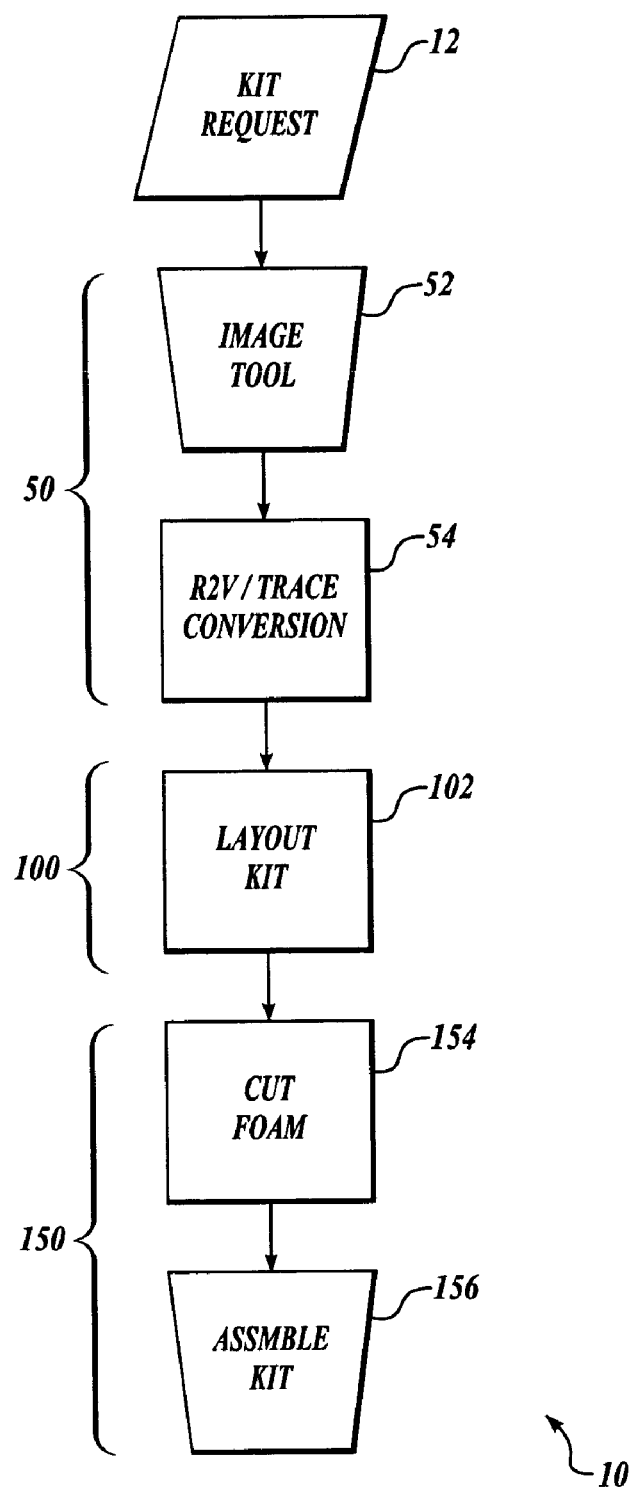
FIG. 1 is a flow chart of a method of preparing tool kits according to the present invention.

FIG. 1 is a flow chart of an exemplary tool kit making method 10 of the present invention. The method 10 begins at a block 12 where a kit is requested. The kit request includes a list of one or more tools or items to be included in the kit. At a segment 50, tool information is acquired. Within the segment 50, a tool is imaged at block 52, and an outline of the image of the tool is traced at a block 54. The tool image may be acquired through any suitable imaging device. In an exemplary embodiment, the tool is imaged at the block 52 using a digital camera which creates a raster digital image. Suitable digital cameras include, without limitation, a Sony digital still camera storing a raster image on a mini CD. It will be appreciated that the image of the tool acquired at the block 52 may be acquired in the form of a photograph, a CAD drawing, a vector drawing, or form other than a raster digital image.

At a block 54, the outer edge of the image of the tool is traced to create an outline of the tool. In a present embodiment, the outline is created by tracing the edge of the image of the tool with a software application running on a microcomputer and converting the tracing from a raster format to a vector format. Tracing and raster-to-vector conversion suitably may be accomplished, by way of example and not limitation, through the use of features of commercially available microcomputer software, including Adobe Illustrator. Other software manufacturers market other software which include capabilities to convert various types of images to outlines and then to suitably convert the outlines to vector or other computerized or machine readable format.

After acquisition of the tool outline or outlines, a tool kit may be laid out at a segment 100. The kit itself is laid out at a block 102. Laying out of the kit in this exemplary embodiment suitably includes positioning the tool outline within an outline of the inside dimensions for a tool case, drawer, or other suitable tool holder, in a configuration useful to the end user of the tool kit. The resulting kit configuration may include one or more tool outlines, and may include outlines for parts or other items utilized by the end user with the tool kit. Layout of the kit at block 102 suitably may be accomplished on a computer video display screen utilizing a graphic display manipulation computer application, such as Adobe Illustrator.

The kit is manufactured at a segment 150. Segment 150 suitably includes cutting foam packing (also known as inserts) for the tool kit to match the kit configuration at a block 154, and assembling the tool kit at a block 156. Cutting of the foam packing at the block 154 may be done utilizing any suitable cutting device. In an exemplary embodiment of the invention, a computer numerical controlled water jet cutter is utilized to cut the foam packing for the tool kit. The process of cutting the foam at the block 154 may suitably include the conversion of the kit layout generated in block 102 to a machine readable form, and then controlling a cutting device using the machine readable form. In an exemplary embodiment the machine readable form is a .dxf or document exchange format file which may be utilized by the water jet cutter to control the cutting of the foam packing. The cutting of the foam at the block 154 may also suitably include automated or computer based checking of the kit configuration to ensure that the tool outlines close on themselves (i.e. the outlines and other features form completed loops to be cut and removed from the foam for example) so completed cuts are made, and that there are no overlapping cuts. In an exemplary embodiment, a program True Nest is suitably utilized to check the kit configuration file prior to cutting. It will be appreciated that packing may be molded as otherwise manufactured rather than cut, in which case the package is molded as otherwise manufactured rather than cut to conform to the kit configuration.

Figure 2:
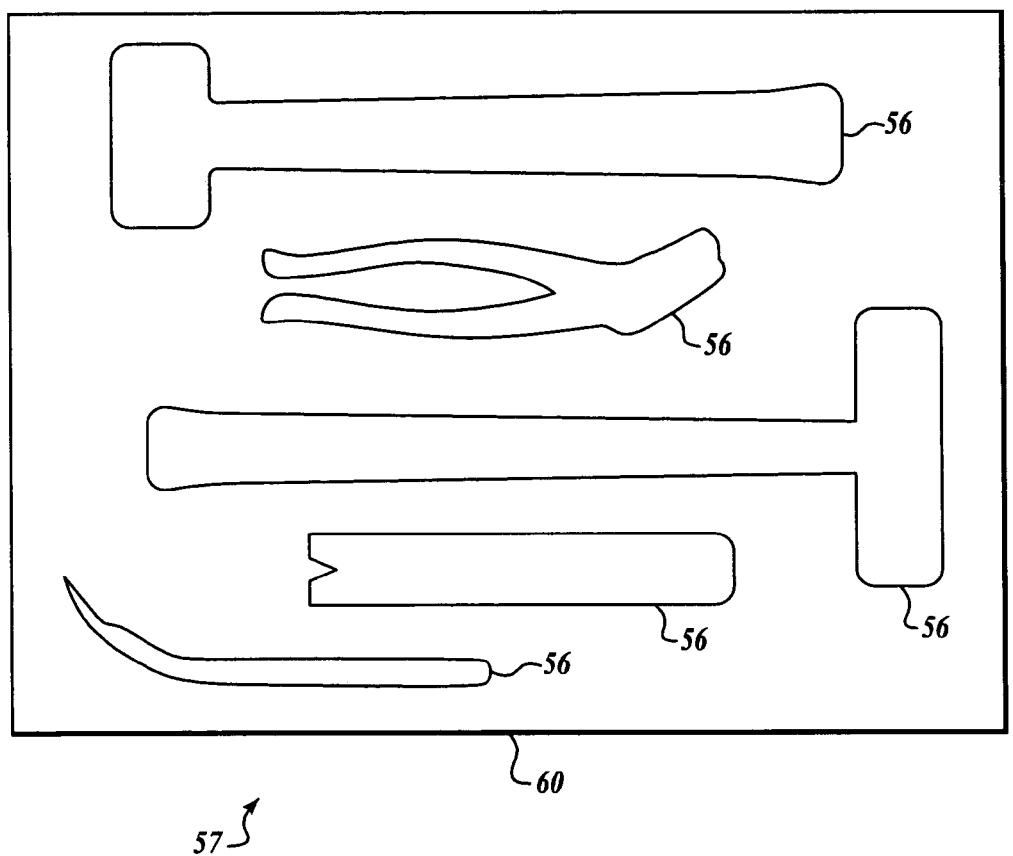
FIG. 2 is a diagram of a tool kit configuration of the present invention.

FIG. 2 is an exemplary tool kit packing configuration 57. The configuration 57 includes outlines 56 of a number of tools (not shown) and is bordered by a kit outline 60 that conforms to the inside dimension of the container, tool case or drawer into which the packing and the tools are ultimately assembled. Packing such as foam, cardboard, molded plastic, or other packing material suitably may be prepared using the method of the present invention.

Figure 3:
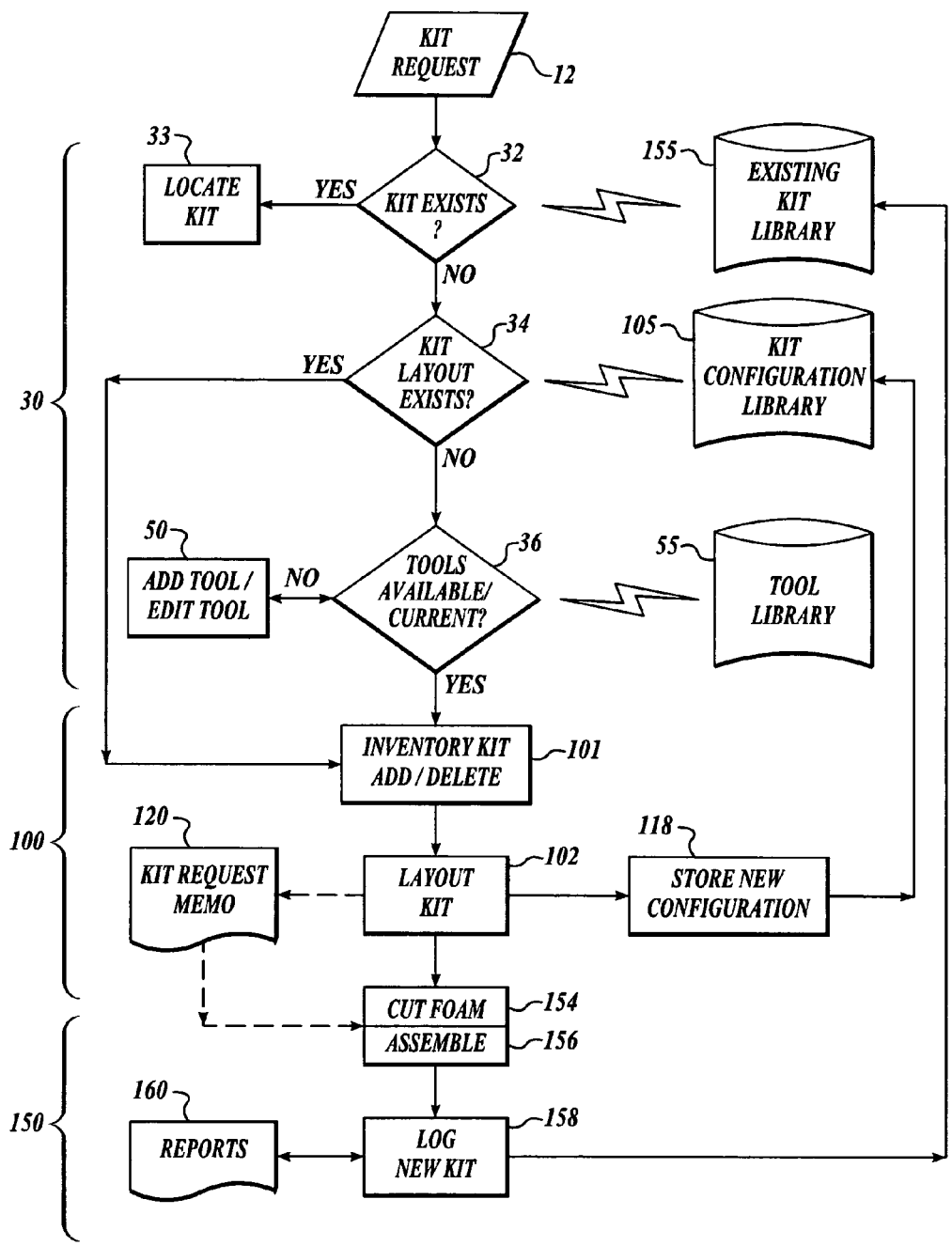
FIG. 3 is a flow chart of a tool kit management method of the present invention.

FIG. 3 is a flow chart of an exemplary method 20 of the present invention that includes tool kit design and tool kit inventory management. In a preferred embodiment, by way of example and not limitation, the method 20 is implemented using a system (described in detail in connection with FIG. 14 below) including a microcomputer running a computer application implementing the method 20, an imaging device (not shown) and a water jet cutter (not shown). At a block 12, a kit is requested by an end user. A search process segment 30 of the method 20 includes a search process to locate existing tool kits within segment 30 at a decision block 32, a decision is made whether to use an existing kit at a decision block 34, and a query is made if tool outlines for the desired tools are available at a decision block 36. In the kit request at the block 12, in an exemplary embodiment, a list of requested tools for the desired tool kit is submitted with the kit request. After the kit request is submitted, a decision point is reached as to whether a tool kit of the type requested is already in existence at the decision block 32. That inquiry is based upon consultation with an existing tool kit library 155. In an exemplary embodiment the existing kit library 155 is a computer based database, such as a database utilizing the Oracle database program by Oracle Corp. If the desired tool kit exists, at a block 33, the existing tool kit is located for the end user.

If no available tool kit exists, a decision is made at the decision block 34 as to whether a kit layout or kit configuration for the requested kit already exists. In an exemplary embodiment, this decision is based on consultation with a kit configuration library 105. The kit configuration library 105 suitably may be a computer-based database by way of example, of the same type as the existing tool kit library 155 described above. If a tool kit configuration exists for the desired tool kit, the method 20 proceeds to a segment 100 where the inventory of the tools in the kit and the tool outlines for the tool kit are confirmed.

If there is no kit configuration matching the desired tool kit, a decision is made as to whether there is current data and outlines for the requested tools at the decision block 36. The decisions made at the decision block 36 are made in consultation with a tool library 55 which contains tool outlines and data on tools that have been imaged and prepared for the kit making process. By way of example, the tool library suitably may be a computer-based database of the same type as the existing tool kit library 155 described above. If any of the requested tools are not available or are not current, tools or information may be added, or the tool shapes edited at a block 50 where tool acquisition and tool outline editing is done. The process of adding tools to the available tool library and/or editing tools at the block 50 is described in more detail with respect to FIG. 4 below. Once outlines for all the requested tools are available from new additions a the block 50, if appropriate, and the outlines and data for the requested tools are gathered from the tool library 55.

With a full contingent of the requested tools available, the method 20 proceeds to a segment 100 for kit configuration. The segment 100 includes kit inventory confirmation at a block 101 and kit layout at a block 102. In this exemplary embodiment, an inventory of the kit, now with tool information and tool outlines, is confirmed at a block 101. Tools still may be added or deleted from the inventory of the kit at this stage, whether that inventory has just been assembled from new tools added or edited at the block 50, or the inventory comes from an existing kit layout having been located in the existing kit configuration library 105 at the decision block 34.

With the kit inventory confirmed at the block 101, the kit layout or configuration is arranged or laid out at a block 102. At the block 102, the tool outlines (not shown) may be rearranged into a desired configuration within the dimensions of the desired tool kit case (not shown). When layout of the kit is complete at the block 102, the new kit configuration is stored in the kit configuration library 105 at a block 118, thereby increasing the available kit configurations stored for later use. In an exemplary embodiment, layout, editing, and rearranging tool outlines to form a suitable kit configuration are done graphically on-screen using a microcomputer. After layout at block 102, a kit request printout, transmittal or memorandum suitably may be generated at a block 120 for transmittal to those who will be cutting the tool packing and assembling the tool kit. By way of example, a kit manufacturing request may be transmitted electronically to the manufacturing facility or equipment together with accompanying kit configuration data files.

After completion of laying out of the kit, the kit is manufactured at a segment 150. The segment 150, in the exemplary embodiment, suitably includes cutting and assembling of the packing material at blocks 154 and 156, respectively, and logging in of the new kit at a block 158. At the block 154, in this exemplary embodiment, foam packing (not shown) is cut to conform to the requested configuration of the desired new tool kit. At the block 156, the tool kit is assembled with the tools and packing material placed in the tool case or other holder. After the tool kit is assembled, the new kit is logged-in at the block 158 into the existing kit library 155. In this example embodiment, the existing kit library 155 thus suitably includes an updated inventory of existing tool kits and their locations, the tools they contain, and any other relevant information. Along with logging-in the new kit at the block 158, a hard copy or electronic report may be generated at a block 160. The report suitably includes listings of the contents of the new kit, a revised inventory of existing kits, or other data helpful for managing an inventory of tool kits by an organization with many tool kits.

Figure 4:
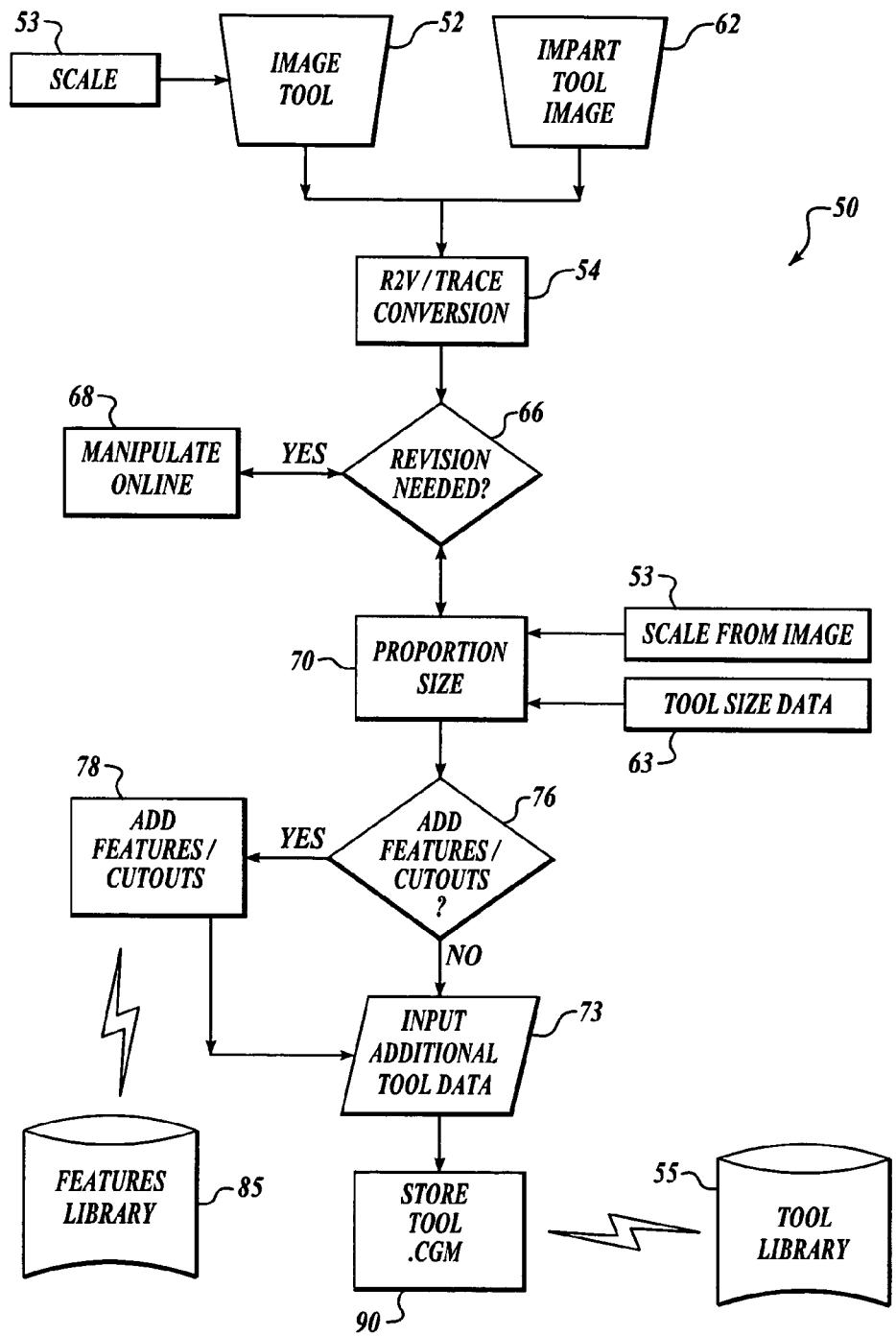
FIG. 4 is a flow chart of an add tool segment of a method of the present invention.

FIG. 4 is a detailed flow chart of exemplary process as performed at the block 50 of FIG. 3 to acquire and edit tool outlines and additional tool data as appropriate. In an exemplary embodiment of the present invention, adding or editing a tool includes imaging the tool at a block 52. As mentioned above, in an exemplary embodiment, the tool is imaged using a digital camera taking a raster digital image. During the imaging of the tool at the block 52, a scale 53 may be inserted into the image either physically when the image is taken, or by adding a reference mark at the time. The scale 53 may be used for cross-referencing or calculating the actual size of the tool when the image is later processed into an outline.

If an alternative source for the tool image, such as a photograph, CAD file, drawings, or other computer file exists, the tool image may be imported at a block 62 instead of imaging the tool at the block 52. After either importing the tool image or imaging the tool, the image is traced and the resulting tracing converted from raster-to-vector format at a block 54. After tracing and raster-to-vector conversion at the block 54, a decision point is reached as to whether the resulting tool outline needs to be revised at a decision block 66. Revisions may be required if the tool has a complicated shape, has openings, or other changes are desired. This may occur, by way of example, for a pair of pliers, where it may be desired to exclude packing material from between the handles. If a revision to the outline is desired, the outline itself can be manipulated. In this embodiment, the outline may be manipulated or edited graphically on a computer processor display at a block 68.

It should be noted that the process in block 50 of adding or editing a tool may be utilized for adding or editing an outline of any object which is desired to be packed or held. By way of non-limiting example, such items may range from electronic equipment to be shipped to bottles of chemicals to be held in storage boxes.

If outline revisions are not desired, or alternately are already completed, the outline is proportioned and sized in block 70 to match the physical dimensions of the item being packed. Proportioning and sizing the outline so that it includes data as to the actual size of the tool or item suitably may be done by importing or consulting the scale 53 from the image, or by importing or inputting other tool size data at a block 63. It will be appreciated that sizing the outline may be completed at any suitable point in the process of the present invention. In one presently preferred embodiment, the sizing is accomplished at the time of rastor to vector conversion, with the vector information thereafter including size and proportioning information.

After the tool outline is proportioned and sized at the block 70, a decision point is reached at a decision block 76 whether to add additional features or cutout spaces are to be added to the tool outline. Such features or cutout spaces suitably aid in the utility of the tool kit by making it easier to place and remove tools or items in the packing. By way of example and not limitation, features or cutout spaces that can be added to tool outlines include half-circle finger access holes appended to the outside of the tool outline. Such cutout spaces, when the packing is cut to conform to the tool outline plus an appended finger cutout space, help an operator lift the tool out of the tool case. Other helpful features, by way of example, suitably may include cutouts for tool adapters or attachments, or spaces for parts commonly used, installed or replaced using the tools in the kit. If additional features are desired, features and cutout spaces can be added at the block 78. The adding of features and cutout spaces, in an exemplary embodiment, may include consultation with a features library 85 configured to include cutouts and outline features that can be selected and added to tool outlines. In this embodiment, features and cutouts may be selected from a menu of available features and cutouts, in lieu of being custom designed every time a cutout space is desired. By way of example, the features library 85 suitably may be a computer based database such as the existing kit library 155 described in reference to FIG. 3.

After the tool outline is configured with the desired features or cutout spaces, an opportunity exists to input additional tool data at a block 73. Additional tool data may include meta-data such as manufacturer's names, part numbers, prices, other accounting data, specific tool instructions, or other data concerning the tool for which an outline is being created. After importing of any desired additional tool data at the block 73, the tool outline, with any accompanying data, is stored at a block 90. In this example embodiment, the tool outline and related data is stored as in a computer graphics meta-file or .cgm file in a tool library 55. As in FIG. 3, the tool library 55 suitably may be a computer-based database. As tool outlines are added and edited, the tool library 55 grows to include an inventory of a plurality of tools available for selection when tool kits are requested and configured.

Figure 5:
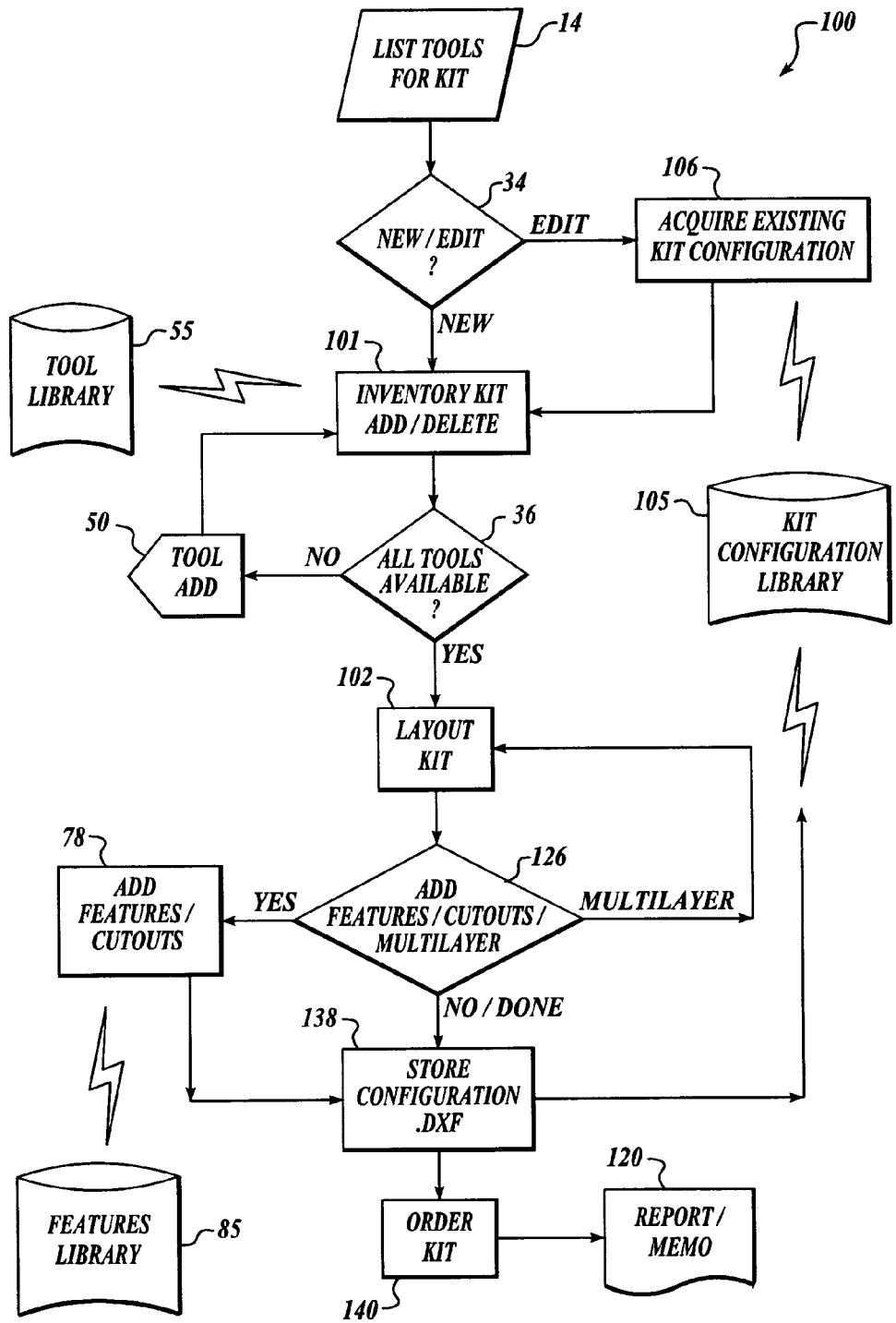
FIG. 5 is a flow chart of a kit configuration segment of a method of the present invention.

FIG. 5 is a detailed flow chart of the kit configuration segment 100 of FIG. 3 of an example embodiment of the present invention. The segment 100 includes laying out the kit configuration, either using existing configurations, or by adding further configurations as required. Segment 100 starts with a list of tools for the desired tool kit at a block 14. An inquiry is made at the decision block 34 whether a configuration exists for a kit containing the requested tools, by consulting a kit configuration library 105, containing previously-stored kit configurations. At the decision block 34, if a kit configuration exists that partially or completely matches the requested tool list, the segment 100 acquires the existing kit configuration from the kit configuration library 105 at a block 106.

If no matching or helpful kit configuration is available, data for the requested tools are added to the inventory of a new configuration at a block 101. In inventorying the kit at the block 101, the consultation occurs with a tool library 55, retrieving tool outlines for the desired tools together with any tool meta-data. A determination is made at a decision point 36, whether data for all the tools requested are available. If all the requested tools are not available, the needed tools are added at a block 50, described in further detail in connection with FIG. 4, above. After adding tools at the block 50 or retrieving tools from the tool library 55 at the block 101, and when all requested tool outlines and data are available at the decision block 36, the segment 100 proceeds to lay out the kit at a block 102. In an exemplary embodiment, each of the steps in the kit configuration segment 100 suitably may run on a desktop micro-computer (not shown) running a computer application moving through the steps of the segment 100.

The kit configuration is laid out at a block 102. The kit configuration represents the desired physical layout of the location of tools within the kit when the kit is assembled. In an exemplary embodiment, this entails locating and relocating tool outlines within a tool kit case outline on a graphic display linked to a desktop micro-computer. Laying out the tool kit allows the tools to be located within the packing of the tool kit in an arrangement convenient for the end user. As the kit configuration is laid out, a determination is made at a decision block 126 whether additional features or cutout spaces are suitably added to tool outlines, and whether multi-layer packing (described immediately below) is being generated. If additional features and cutout spaces are desired, then they are added at the block 78. Features may be custom drafted or may be selected by communicating with a features library 85, which has previously generated features and cutout spaces for adding to tool outlines. New features or cutout spaces may be created by the user by creating them at the block 78.

Multi-layer packing allows tools and items with different thicknesses to be packed in a common kit or container without the smaller or thinner items being too loosely held or otherwise dropping too deep within the packing to be easily accessible by a user. In an exemplary embodiment, multi-layer packing can be created using the segment 100 for kit configuration by laying out multiple layers of packing. This suitably may be implemented by repeatedly looping through the block 102, laying out each packing layer of the kit separately. Outlines for thicker or larger objects or tools are cut from multiple layers of packing. Smaller tool outlines may be cut out of only one layer, typically the top layer of the kit. Thus, in generating the kit configuration, a multi-layer kit will have a plurality of packing layer configurations, one for each packing layer. Thus, by way of example, but not limitation, multi-layer kits are laid out by suitably repeating the block 102 for each packing layer.

After suitable features and cutouts are added to the kit layout, if desired, and multi-layer configurations are generated, if desired, the kit configuration is then stored in a kit configuration library 105 at a block 138. In an exemplary embodiment, the kit configurations suitably are stored as a computer-assisted design file such as a .dxf file.

After the kit configuration has been stored, the segment 100 continues with the generation of a manufacturing order for the tool kit at a block 140. In an exemplary embodiment, at the block 140 the kit configuration is transmitted with an order for the kit to a facility that will manufacture the packing and assemble the tool kit. At the point of ordering the tool kit at block 140, or at other suitable points in the kit configuration process, information regarding the kit or details of the tools requested may be documented in a report, transmittal, file record or memorandum, generated at the block 120.

Figure 6:
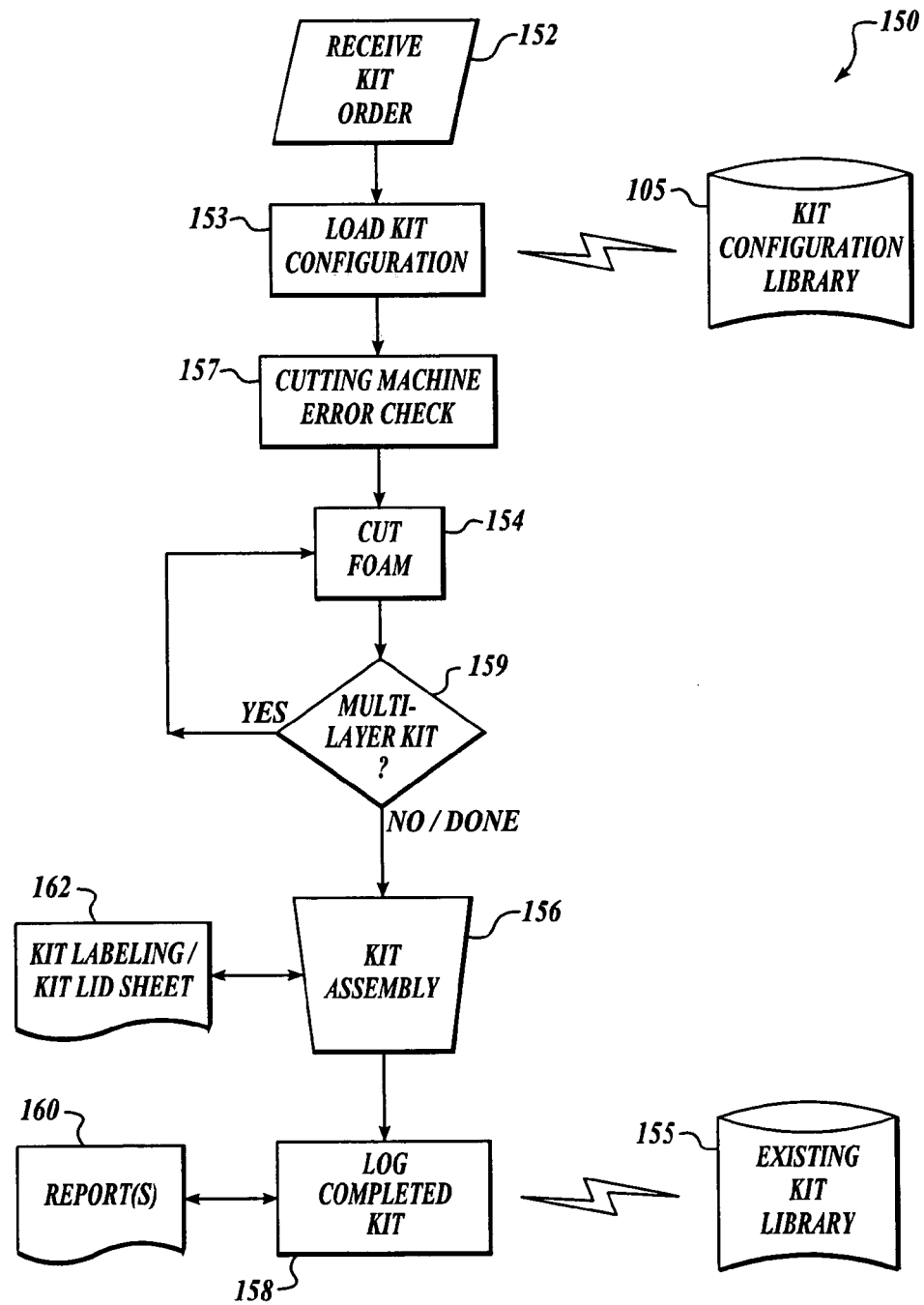
FIG. 6 is a flow chart of a kit assembly and kit logging segment of a method of the present invention.

FIG. 6 is a detailed flow chart of the tool manufacturing segment 150 of FIG. 5. At a block 152, the kit order is received. The requested kit configuration is accessed or loaded at a block 153, either directly from the kit order or from communication with the kit configuration library 105, which contains the stored kit configuration.

At a block 157, the kit configuration is checked for potential errors. Errors may include failure to close or properly end cuts that will be made to the packing while following the tool outlines. In an exemplary embodiment, the cutting machine and its accompanying processor and software has an error checking protocol. By way of example, the program True Nest provides for queuing files to be sent to a water jet cutter, and for error checking those files prior to cutting. The foam, or other packing material or inserts for the tool case or other container, is cut at the block 154. The packing may be cut with any suitable device. In an exemplary embodiment, the cutting advantageously is done by a computer numerical control water jet cutter using an abrasive cutting fluid. Water jet cutters without abrasive materials suitably may be utilized to cut packing. Other cutting devices may suitably include punches, laser cutters, machine cutters, or saws to cut the packing.

At a decision block 159, a determination is made whether a multi-layer kit is being made. If so, the segment 50 returns to the block 154 to cut additional layers of packing for the kit. If the kit or other packing being generated does not have multiple layers, or when all of the layers of a multi-layer kit have been cut, the segment 50 continues to kit assembly at a block 156. In kit assembly at the block 156, the cut packing is placed in the container or tool case being utilized for the tools or items being packed. Tool boxes suitably may include without limitation plastic or metal tool boxes, tool carts, bags of either plastic or fabric, workbench drawers, or other suitable tool containers. For storage or shipping, packing containers suitably may include without limitation fiberboard or cardboard containers, crates, shipping bags, and pallets.

Kit assembly at the block 156 also includes placing the tools or items within the packing within the kit case or container. Kit assembly suitably may also be accompanied by preparation of kit labeling at a block 162. The segment 50, at any suitable point, may include printing or inscribing of labels or lettering for the kit. Such labels or lettering may provide information on the items being packed and their configuration. Such labels or letter may be on, or part of, the packing, the case or container, or may include a label affixed to the case or container. In an exemplary embodiment, the kit labeling process at the block 162 generates a kit lid sheet which includes a graphic representation of the tool outlines in the kit, and tool identification information within or near each outline. The kit labeling sheet suitably may be affixed to any part of the tool kit, but is often installed inside the lid of the tool kit. It will be appreciated that the process of the present invention, in generating tool kit configurations with tool outlines, facilitates the automated production of a label graphically showing the contents of the kit by their outlines. Such a label may include a graphic representation or printout of the tool kit configuration with tool outlines, plus suitable additional information appended to or typed within that configuration.

After kit assembly at the block 156, the completed kit suitably may be logged as a completed kit at a block 158 by communicating the completion of the kit to the existing kit library 155. The existing kit library 155 suitably may contain information about the kit contents, its location, cost of the kit and its components, instructions for use, or any other data relating to the kit useful for creating further such kits, modifying the kit, or tracking the tools and the kit itself in an organization with multiple kits and tools.

It will be appreciated that the method of generating packing for items and tool kits described above may be suitably implemented using a wide range of computer processors and software. In an exemplary embodiment, the processes described above, including adding tools and tool outlines to an available tool data library, searching for tools, adding cutouts or features to tool outlines, creating tool kits, searching for tool kits, editing tool kits, and providing reports are integrated into a tool control computer application that runs the kit design and management process 20 of FIG. 3. An exemplary main menu of such a computer application is shown in a screen shot 220 in FIG. 7.

Figure 7:
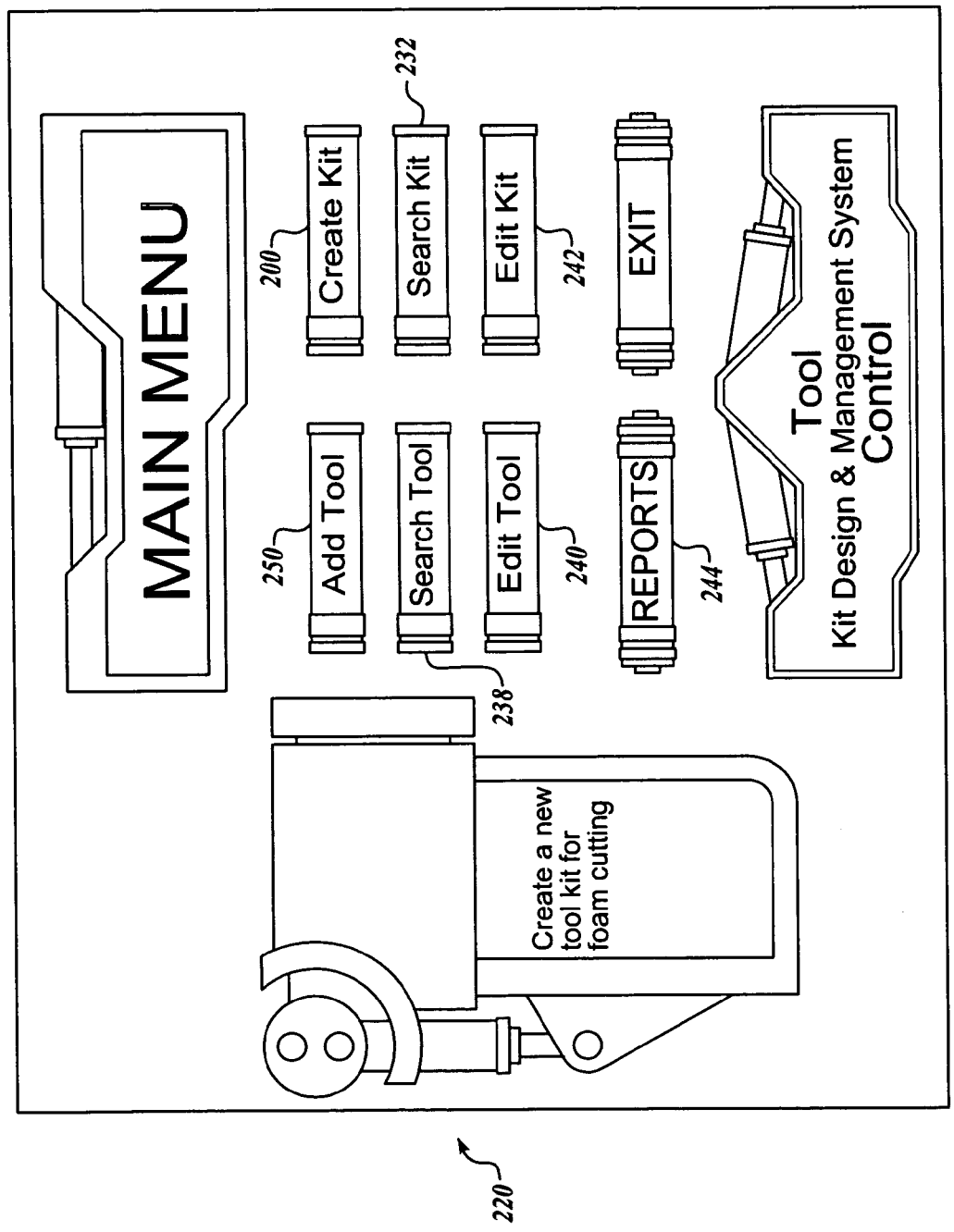
FIG. 7 is a screen shot of a main menu of a tool kit design and management computer application of the present invention.

In FIG. 7, the screen shot 220 shows the main menu of a tool control application. The screen shot 220 includes a button 250 for adding a tool, a button 238 for searching for a tool, a button 240 for editing a tool, a button 200 for creating a kit, a button 232 for searching for a kit, and a button 242 for editing a kit. The main menu also provides a button 244 for generating reports. The referenced buttons may be chosen by clicking on them with a pointing device such as a mouse. Clicking on the button 250 selects provisions for imaging a tool or selecting an image of a tool to add to a tool library. Clicking on the button 238 permits a user to search and determine whether a desired tool has already been imaged and an outline is available, and also to search and find which tool kits already produced include the desired tool. Clicking on the button 240 permits a tool to be revised with either additional or changed meta-data, or with outline changes. This may be appropriate if the shape of the tool has been changed through revisions by the manufacturer, for example. Additional features or cutout spaces may also be added to the tool outline by selecting button 240. Clicking on the button 200 leads to a routine for inputting a list of desired tools and then creating a new tool kit. Clicking on the button 232 leads to a routine that searches for kits containing some or all of the desired tools. Selecting the button 242 permits the user to edit the configuration of an existing kit, thereby changing its layout which may include adding or deleting tools. Clicking on the button 244 leads to a routine for generating reports relating to existing tool kits, tool configurations, available tools, available tool outlines, and tool meta-data.

Figure 8:
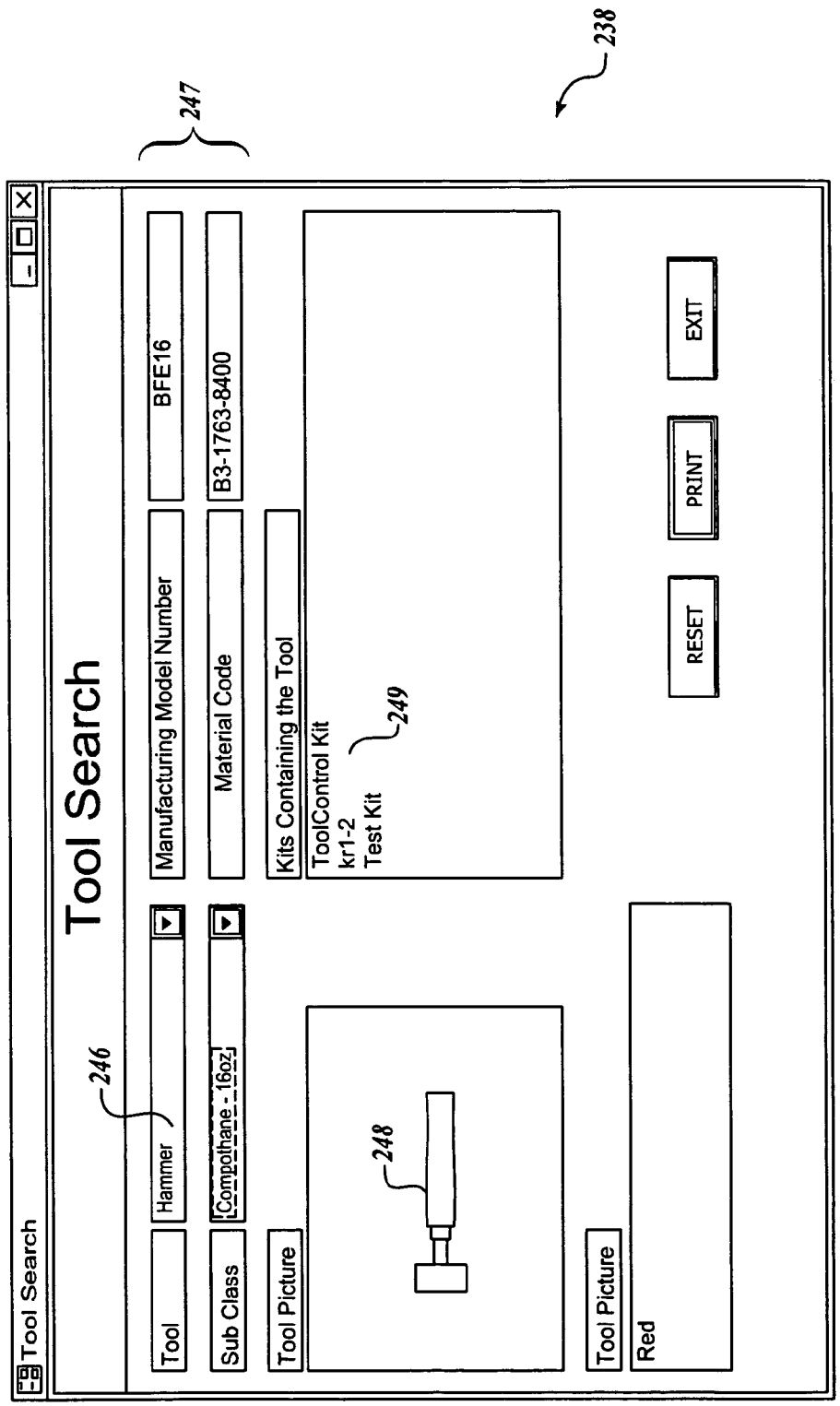
FIG. 8 is a tool search screen shot of a tool kit design and management computer application of the present invention.

FIG. 8 is a screen shot 238 of an example search tool routine accessed by clicking on the button 238 of FIG. 7. A tool name 246 is selected from a list of choices or input. A tool picture 248 for the selected tool is then displayed. Meta-data 247 for the tool, such as the manufacturing model of the tool and the company code for the tool, may also be displayed. Kits 249 containing the requested tool are displayed in a list.

Figure 9:
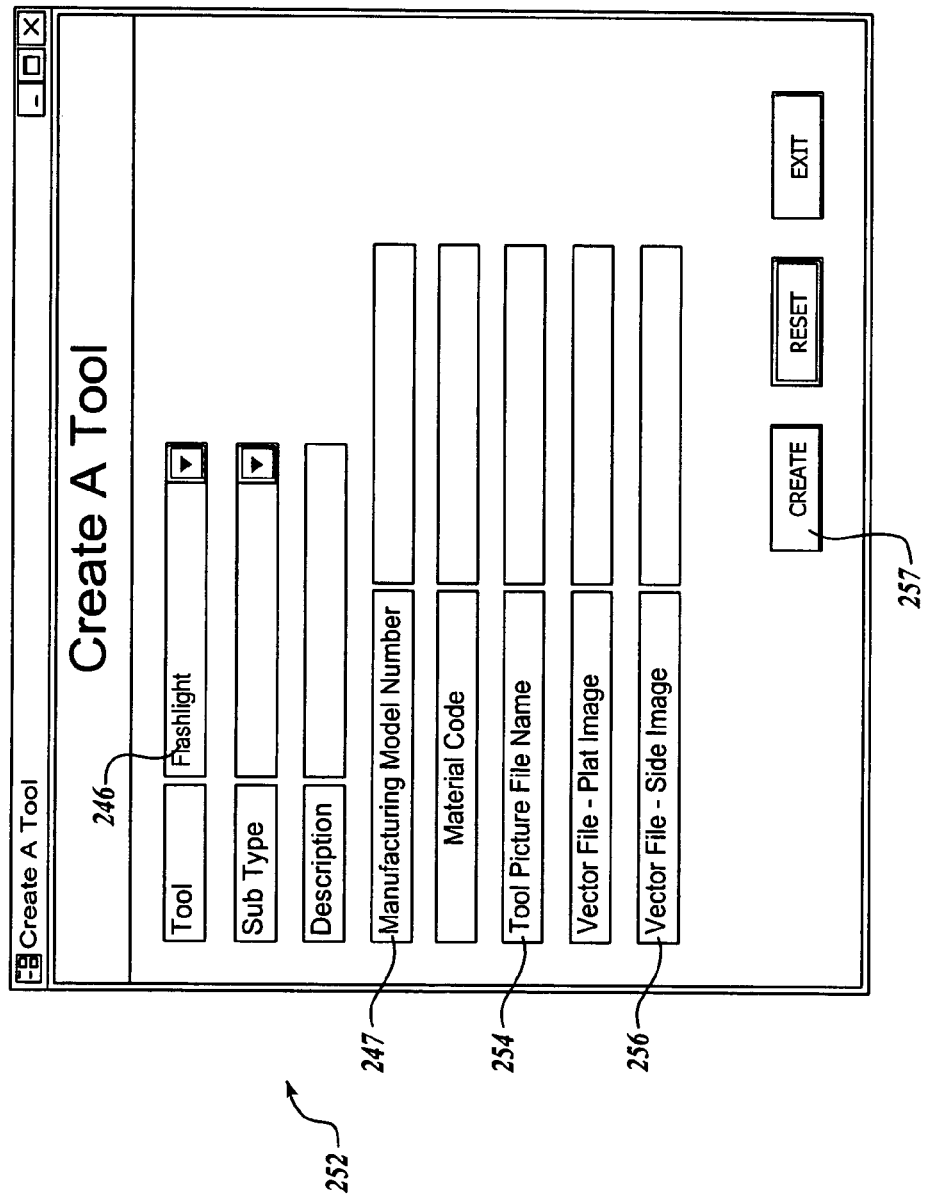
FIG. 9 is a create a tool screen shot of a tool kit design and management computer application of the present invention.

If a desired tool is not yet imaged or available for a tool control computer application, a create tool routine illustrated in a screen shot 252 in FIG. 9 may be accessed. The create a tool routine allows tool data to be input for use by the computer application. A tool name 246 may be input. Meta-data 247 concerning the tool may be input. A tool picture file name of an image taken previously may be input, in this exemplary embodiment, as a raster picture file name 254 or vector picture file name 256. A tool record may then be created by selecting a create button 257.

Figure 10:
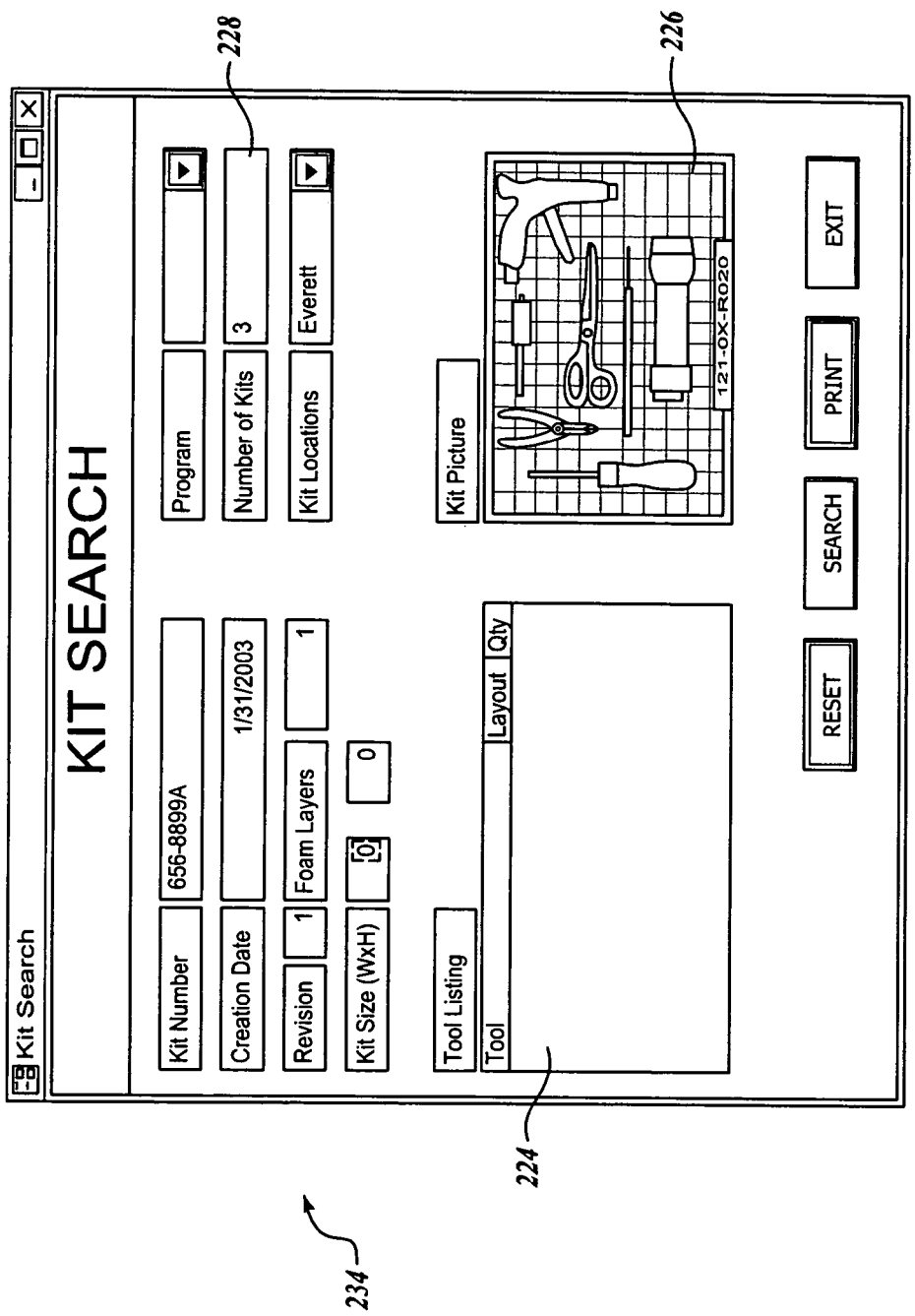
FIG. 10 is a kit search screen shot of a tool kit design and management computer application of the present invention.

FIG. 10 is an example screen shot 234 of a kit search routine of an exemplary tool control computer application of the present invention. The kit search routine permits a list of desired tools to be input as a tool listing 224. The application may then display a picture 226 of a previously-manufactured tool kit. Meta-data 228 about existing kits may also be displayed such as showing the user where kits with the desired tools currently exist.

Figure 11:
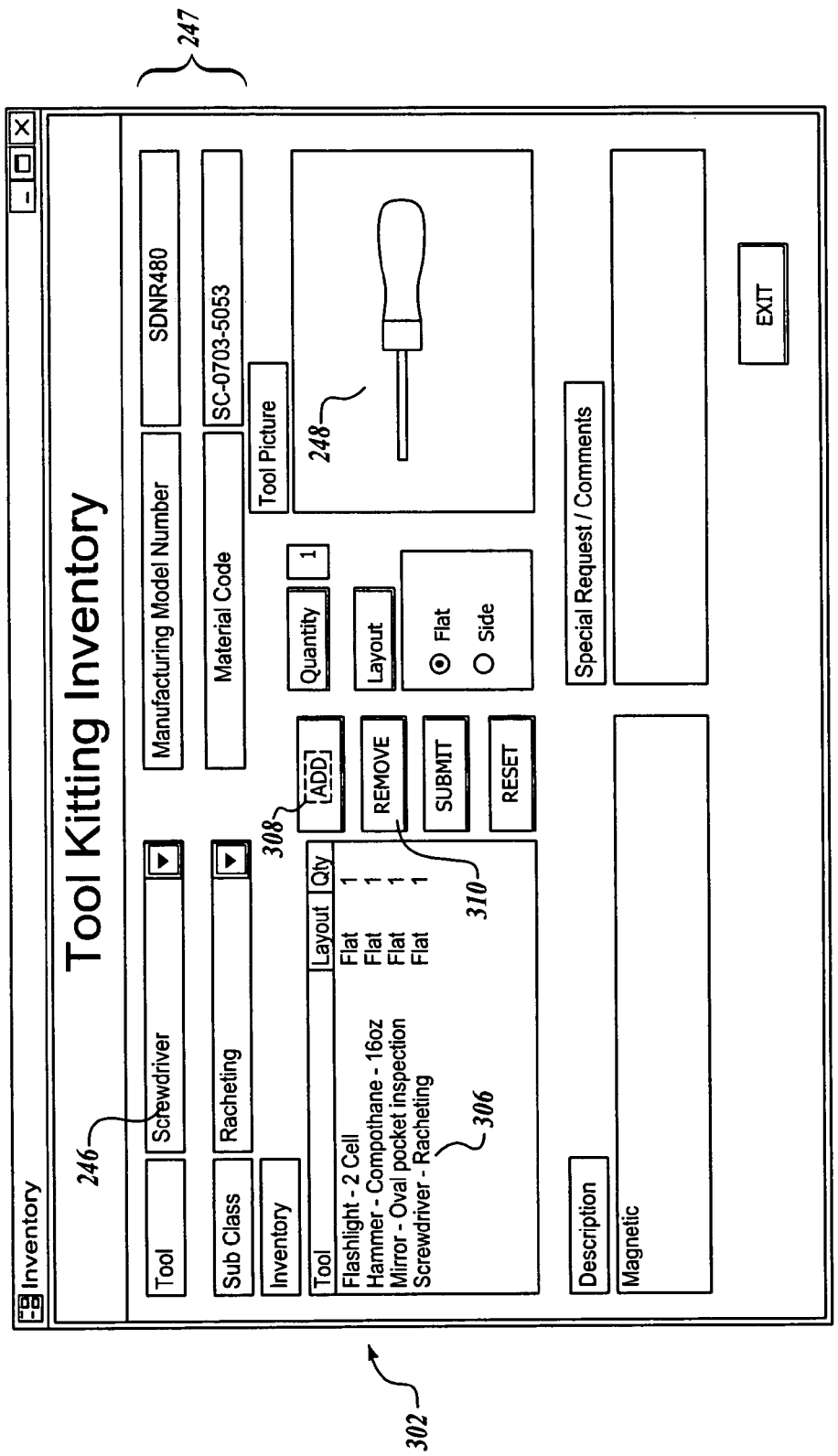
FIG. 11 is a tool kitting inventory screen shot of a tool kit design and management computer application of the present invention.

FIG. 11 is an example screen shot 302 of a tool kitting inventory routine of an exemplary tool control application of the present invention. The tool kitting inventory routine permits tools to be added or deleted from a tool kit inventory prior to requesting manufacture of the tool kit. The tool kitting inventory screen shot 302 provides spaces for input of the tool name 246 of a tool to add, and spaces for input of meta-data 247 regarding details of the tool. It may display the names of already-selected tools 306. It permits the user to select a button 308 to add a selected tool from the tool kit inventory. Alternately, a button 310 may be selected to remove a selected tool from the tool kit inventory. The user suitably may highlight one of the selected tools to delete or may input a new tool 246 to add. The screen shot 302 suitably also displays a tool picture 248 of the tool currently under consideration for adding or deleting from the kit.

FIG. 12 is a screen shot 304 of a create a kit routine of an exemplary tool control application of the present invention. After a tool kit has been inventoried, the create a kit routine displays the tool names 306 of the tools selected, and accesses vector files 312 for the tool outlines of the tools selected. After confirmation of the tools 306 to be included in the kit, obtaining the vector files 312 of their outlines, and after any entry of additional extra data concerning, by way of example and not limitation, the kit requester, locations, number of layers of foam, etc., the user may select a button 314 to create a kit configuration with the selected tools.

Figure 13:
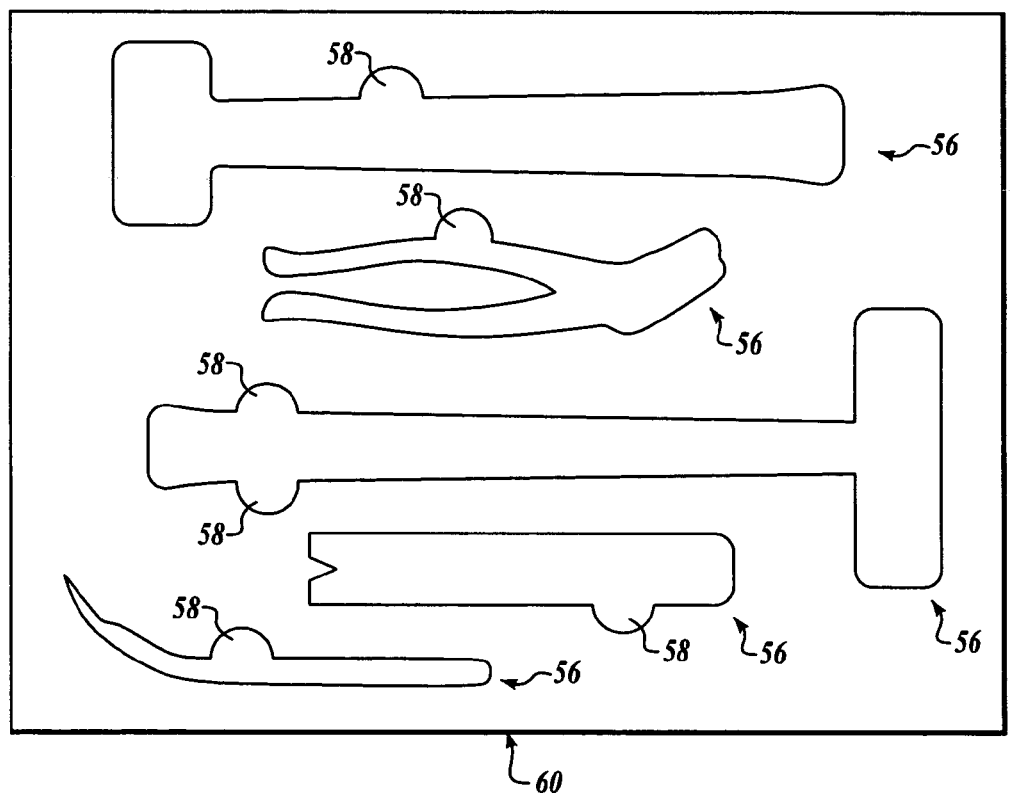
FIG. 13 is a tool kit configuration with additional cut-out spaces of the present invention.

After creating the kit configuration, the kit configuration may be edited. FIG. 13 shows an exemplary kit outline 60 generated by an exemplary create a kit routine of the present invention. In editing the tool configuration, a user may move or relocate the tools 56 within the kit outline 60. The user may also add cutout spaces 58 or other additional cutout features to the outline of the tools 56. The cutout spaces 58, in this example, are half-circles which provide additional space for the fingers of a tool kit user to fit through the packing alongside the tool to aid in removing the tools (not shown) from the kit (not shown). In an exemplary embodiment, the kit outline 60, the tool outlines 56, and the cutouts 50 are displayed on a graphics display screen and may be manipulated and relocated by the user using a pointing device such as a mouse. Adobe Illustrator [name exemplary computer program used for this manipulation]

Figure 14:
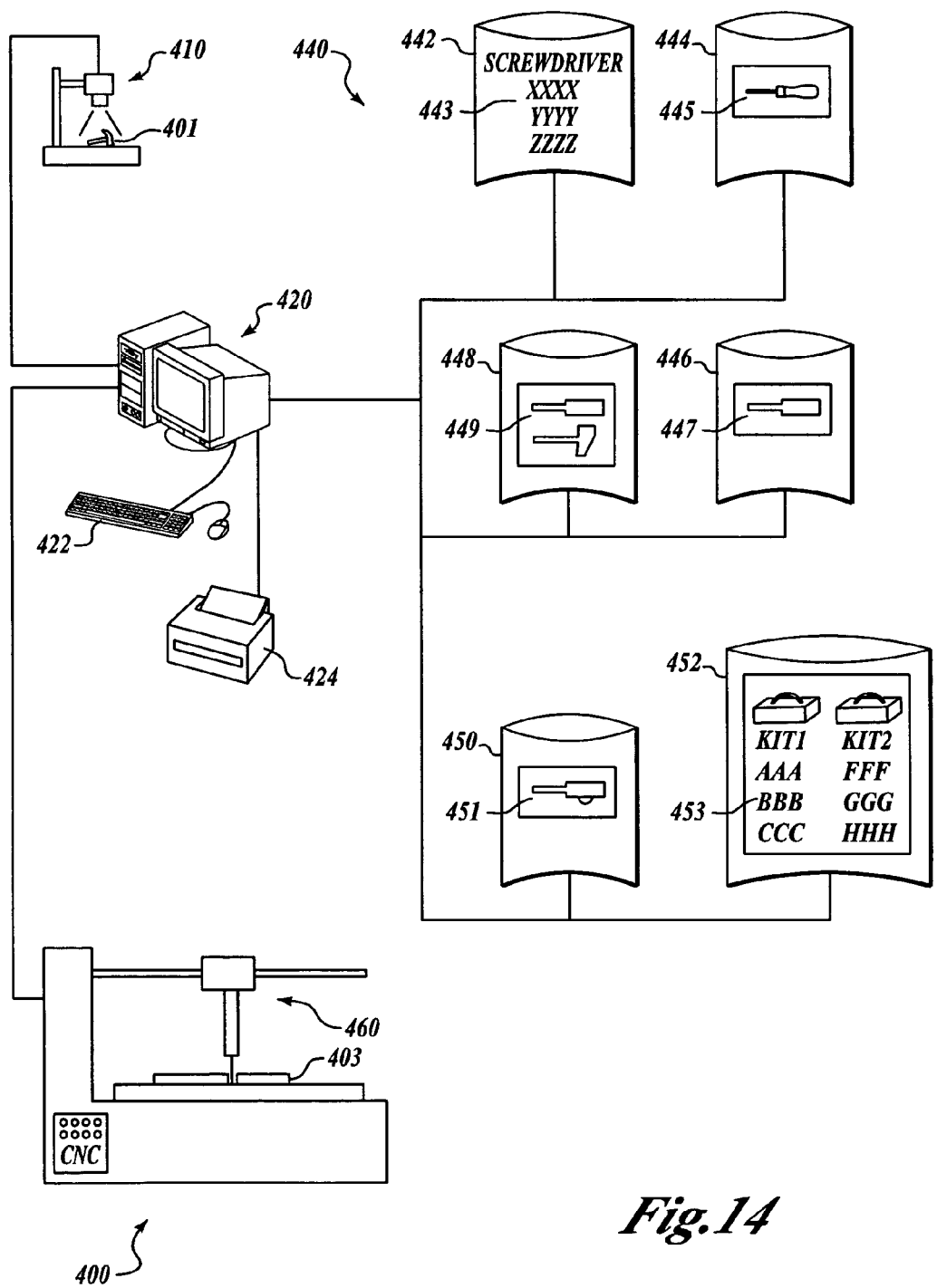
FIG. 14 is a component drawing of a exemplary tool kit design and management system of the present invention.

FIG. 14 is a component diagram of an exemplary tool kit design, assembly and management system 400 implementing the present invention. The system 400 includes an imaging device 410 that is utilized to image a tool 401. As noted above, the system 400 suitably may be utilized for imaging items other than tools for packing in suitable containers or casings. The imaging device 410 is connected to a computer processor 420. The processor 420 is controlled by a user and operates a computer application implementing the process of the present invention. The processor 420, in this exemplary embodiment, is linked to six databases 440.

The databases 440 contain information concerning tools, tool images, tool outlines, kit configuration, special features, and existing kits. A database 442 includes tool meta-data 443 such as detailed information concerning specific tools. A database 444 contains images 445 of tools that have previously been captured by the system. A database 446 contains outlines 447 of tools that have had their images converted to tool outlines. A database 448 contains kit configurations 449 with tool and kit case outlines in configurations that have previously been arranged using the system 400.

A database 450 includes special feature or cutout space definition files 451. The cutout definition files 451, in an exemplary embodiment, include cutouts and special features that have been previously defined using this system 400 that may be selected to append to a tool outline 447. These include cutouts such as for finger access to remove tools from the kit.

A database 452 contains tool kit files 453 with data on existing tool kits that have been created utilizing the system 400 of the present invention.

The processor 420 used to control the system 400 of this exemplary embodiment is linked to user input devices 442. In this embodiment, input devices 442 include a keyboard and mouse. Other input devices suitably may include remote computers connected via a computer network such as the internet.

In this embodiment, the processor 420 is also connected to a display device 424 arranged to display or output information regarding the system 400 and the data stored in its databases 440. In an exemplary embodiment, the display device 424 includes a printer.

The processor 420 is also connected to a cutting device 460 utilized to cut the packing material 403 for, in this embodiment, tool kits. As noted above, the cutting device 460 is any suitable cutting or forming device, including, by way of example, a CNC water jet cutter.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A method for creating customized packing for an item to be packed, the method comprising:
   providing a raster image of the item on at least one computer;
   determining an outline of the raster image using the at least one computer;
   converting the outline of the image to a vector form using the at least one computer; and
   manufacturing a packing material to conform to the outline using the at least one computer.

2. The method of claim 1, wherein the outline is a three-dimensional outline.

3. The method of claim 1 further comprising cutting a second packing material configured to form a multi-layer packing assembly with the packing material.

4. The method of claim 1, wherein manufacturing the packing material includes utilizing a cutting machine guided by the vector form.

5. The method of claim 1, wherein providing a raster image of the item includes obtaining a raster image from an image database.

6. The method of claim 1, further comprising sizing the outline to conform to an actual size of the item.

7. The method of claim 1, further comprising storing the outline of the raster image in an outline database.

8. A method for creating customized tool kit packing for at least one tool, the method comprising:
   creating at least one image of the at least one tool;
   tracing at least one outline of the at least one image using a software routine operating on a computer;
   converting the at least one outline to a machine readable form; and
   cutting a packing material for a tool kit to conform to the at least one outline by utilizing a cutting machine guided by the machine readable form.

9. The method of claim 8, wherein the at least one image includes a digital raster image.

10. The method of claim 9, wherein converting the at least one outline to a machine readable form includes a raster-to-vector conversion.

11. The method of claim 8, further comprising cutting the packing material to fit within a tool case.

12. The method of claim 8, further comprising sizing the at least one outline to conform to an actual size of the at least one tool.

13. The method of claim 8, further comprising adding a cutout space to the at least one outline, the cutout space being arranged to aid placing and removing the at least one tool in the packing material.

14. The method of claim 8, further comprising assembling the a tool kit by placing the packing material in the case and placing the at least one tool within the packing material.

15. The method of claim 8, further comprising printing a labeling sheet showing the at least one outline of the at least one tool, the labeling sheet being arranged to be included with the tool kit.

16. A method for managing packing preparation for at least one item, the method comprising:
   providing a set of images of corresponding set of items on at least one computer;
   tracing a set of outlines corresponding to the set of images using the at least one computer;
   converting the set of outlines to at least one machine readable form using the at least one computer; and
   storing the set of outlines in an outline library.

17. The method of claim 16, further comprising selecting a subset of outlines from the set of outlines from the outline library.

18. The method of claim 17, further comprising arranging the subset of outlines in a packing configuration to fit within a container.

19. The method of claim 18, further comprising cutting a first packing material to conform to the packing configuration and fit within the container.

20. The method of claim 19, wherein cutting the first packing material includes utilizing a cutting machine guided by the machine readable form.

21. The method of claim 18, further comprising storing the packing configuration in a packing configuration library.

22. The method of claim 21, further comprising retrieving the packing configuration from the packing configuration library.

23. The method of claim 16, wherein converting the set of outlines to a machine readable form includes a raster-to-vector conversion.

24. The method of claim 16, further comprising adding at least one cutout space to the set of outlines, the at least one cutout space being arranged to aid in packing the at least one item in a first packing material.

25. The method of claim 16, further comprising cutting a second packing material configured to form a multi-layer packing assembly with the first packing material and being arranged to conform to the subset of outlines and fit within the container.

26. The method of claim 19, wherein the set of images includes digital raster images.

27. The method of claim 16, wherein cutting the second packing material includes utilizing a cutting machine guided by the machine readable form.

28. A method for managing tool kit packing preparation for at least one tool, the method comprising:
providing a set of images of at least one tool;
tracing a set of outlines of the images of the at least one tool using a software routine operating on a computer;
converting the set of outlines to a machine readable form; and
storing the set of outlines in an outline library.

29. The method of claim 28, further comprising selecting a subset of the set of outlines from the outline library.

30. The method of claim 29, further comprising arranging the subset of outlines in a configuration to fit within a tool case.

31. The method of claim 30, further comprising cutting a first packing material for a tool kit to conform to the subset of outlines and fit within a tool case.

32. The method of claim 31, wherein cutting the first packing material includes utilizing a cutting machine guided by the machine readable form.

33. The method of claim 32, further comprising cutting a second packing material configured to form a multi-layer packing assembly with the first packing material and being arranged to conform to the subset of outlines and fit within the tool case.

34. The method of claim 33, wherein cutting the second packing material includes utilizing a cutting machine guided by the machine readable form.

35. The method of claim 30, further comprising storing the packing configuration in a packing configuration library.

36. The method of claim 35, further comprising retrieving the packing configuration from the packing configuration library.

37. The method of claim 28, wherein the set of images includes digital raster images.

38. The method of claim 28, wherein converting the set of outlines to a machine readable form includes a raster-to-vector conversion.

39. The method of claim 28, further comprising sizing the set of outlines to conform to actual sizes of the at least one tool.

40. The method of claim 28, further comprising adding at least one cutout space to the set of outlines, the at least one cutout space being arranged to aid in placing and removing the at least one tool in a first packing material.

41. A method for managing tool kit inventory and assembly for a plurality of tool kits, the method comprising:
securing a raster image of an item on at least one computer;
determining an outline of the raster image using the at least one computer;
converting the outline of the raster image to a vector form using the at least one computer;
storing the outline of the vector imagee in a first library on the at least one computer;
arranging the outline of the vector image in a packing configuration to fit within a tool case using the at least one computer;
storing the packing configuration in a second library on the at least one computer;
manufacturing a packing material to conform to the packing configuration using the at least one computer;
assembling a tool kit by placing the packing material in the tool case and placing the tool within the packing material; and
logging the tool kit into a third library on the at least one computer.

42. The method of claim 41, wherein the manufacturing the packing material includes utilizing a cutting machine.

43. The method of claim 41, wherein the outlines include at least one three-dimensional outline.

44. The method of claim 41, wherein securing a raster image of an item on at least one computer includes obtaining a raster image from an image database.

45. The method of claim 41, wherein arranging includes retrieving and editing any of a second outline and a second packing configuration from the first and second libraries, respectively.

46. The method of claim 45, wherein arranging further includes includes at least one of adding an outline, re-arranging a packing configuration, deleting an outline, and editing an outline.

47. The method of claim 41, further comprising locating a tool kit using the third library on the at least one computer.

48. The method of claim 41, further comprising preparing a report.

49. The method of claim 41, further comprising determining an outline of a cutout space, and wherein arranging further includes positioning the outline of the cutout space in the packing configuration.

50. The method of claim 49, further comprising storing the outline of the cutout space in a fourth library.

51. The method of claim 41, further comprising printing a labeling sheet, the labeling sheet being arranged to be included with a tool kit and being further arranged to include the outlines of the plurality of tools included within the tool kit.

52. A system for preparing packing material, the system comprising:
an imaging device configured to provide a raster image of at least one item;
a processor coupled to the imaging device and arranged to accept the raster image of the at least one item from the imaging device, the processor including a first component configured to determine an outline of the raster image and convert the outline to a vector form; and
a manufacturing device coupled to the processor and configured to manufacture a packing material to conform to the outline.

53. The system of claim 52, wherein the processor is further adapted to provide a three dimensional outline of the raster image.

54. The system of claim 53, wherein the manufacturing device is further configured to be responsive to the machine readable form.

55. The system of claim 52, wherein the processor further includes a third component configured to size the outline to conform to an actual size of the item.

56. The system of claim 52, further comprising a memory for storing the outline.

57. The system of claim 52, wherein the processor further includes a second component configured to organize the outline in a packing configuration and the manufaturing device is further configured to manufacture the packing material to conform to the packing configuration.

58. An apparatus for creating customized tool kit packing for at least one tool, the system comprising:
- an imaging device configured to create at least one image of the at least one tool;
- a processor arranged to accept the at least one image from the imaging device, the processor including a first component configured to trace at least one outline of the at least one image using a software routine accessible by the processor, the processor being further adapted to convert the at least one outline from a raster form to a vector form; and
- a cutting device adapted to receive command signals from the processor and configured to cut a packing material for a tool kit responsive to the command signals, the tool kit being adapted to conform to the at least one outline and to fit within a tool case.

59. The apparatus of claim 58, wherein the processor further includes a second component configured to convert the at least one outline to a machine readable form.

60. The apparatus of claim 58, wherein the cutting device is further configured to be responsive to the machine readable form.

61. The apparatus of claim 58, wherein the processor further includes a third component configured to size the at least one outline to conform to an actual size of the at least one tool.

62. The apparatus of claim 58, further comprising a first storage component for storing and retrieving the outline.

63. The apparatus of claim 58, wherein the processor further includes a fourth component configured to arrange the at least one outline in a configuration to fit within the tool case.

64. The apparatus of claim 63, further comprising a second stage component for storing and retrieving the configuration.

65. The apparatus of claim 63 further comprising means for editing the configuration.

66. The apparatus of claim 58, further comprising a third stage component for storing and retrieving the at least one outline.

67. The apparatus of claim 58, further comprising means for editing the at least one outline to add at least one cutout space configured to aid in placing or removing the at least one tool from the packing material.

68. An apparatus for managing inventory and assembly for a plurality of tool kits, the system comprising:
- an imaging device configured to create an image of at least one tool;
- a processor arranged to accept the image of the at least one tool, the processor including a first component configured to trace at least one outline of the image, the processor being adapted to convert the at least one outline from a raster form to a vector form;
- a cutting device adapted to receive command signals from the processor and configured to cut a packing material for a tool kit in response to the command signals, the tool kit being adapted to conform to the at least one outline and to fit within a tool case; and
- a first storage component for logging the tool kit.

69. The apparatus of claim 68, further comprising a second storage component for storing the at least one outline.

70. The apparatus of claim 69, wherein the processor further includes a third component configured to selecting a subset of outlines from the second storage component.

71. The apparatus of claim 68, wherein the processor further includes a fourth component configured to arrange the at least one outline into at least one packing configuration to fit within the tool case.

72. The apparatus of claim 71, wherein the processor further includes a fifth component configured to edit the at least one packing configuration.

73. The apparatus of claim 72, further comprising a third storage component for storing the at least one packing configuration.

74. The apparatus of claim 68, wherein the processor further includes a sixth component configured to convert the at least one outline to a machine readable form.

75. The apparatus of claim 74, wherein the cutting device is further configured to be responsive to the machine readable form.

76. The apparatus of claim 68, wherein the processor further includes a seventh component configured to size the at least one outline to conform to an actual size of the at least one tool.

77. The apparatus of claim 68, wherein the processor further includes an eighth component configured to edit the at least one outline to add at least one cutout space, the cutout space configured to aid in placing or removing of the at least one tool from the packing material.

78. The apparatus of claim 68, wherein the processor further includes a ninth component configured to output a label, the label being arranged to be included with the tool kit and being further arranged to display the at least one outline.

79. The apparatus of claim 68, wherein the processor further includes a ninth component configured to prepare at least one report.

80. A computer program product for packing an item, the computer program product comprising:
- a first computer readable program code configured to receive a raster image of an item;
- a second computer readable program code coupled to the first computer readable program code and configured to determine an outline of the raster image;
- a third computer readable program code coupled to the second computer readable program code and configured to convert the outline to a vector form; and
- a fourth computer readable program code coupled to the third computer readable program code and configured to control manufacturing of a packing material to conform to the outline.

81. The computer program product of claim 80, further comprising fourth computer readable program code means for converting the outline to a machine readable form.

82. The computer program product of claim 80, further comprising fifth computer readable program code means for sizing the outline to conform to an actual size of the item.

83. The computer program product of claim 80, further comprising sixth computer readable program code means for storing and retrieving the outline.

84. The computer program product of claim 80, further comprising seventh computer readable program code means for creating a packing configuration including the outline arranged to fit within a container.

85. The computer program product of claim 84, further comprising eighth computer readable program code means arranged to edit the packing configuration.

86. A computer program product for creating customized tool kit packing for a plurality of tools comprising:
- first computer readable program code means for receiving a set of images of a plurality of tools;

second computer readable program code means for tracing a set of outlines of the set of images, and adapted to convert the set of outlines to one or more vector forms;

third computer readable program code means for selecting a subset of outlines from the set of outlines;

fourth computer readable program code means for arranging the subset of outlines in a packing configuration to fit within a tool case; and fifth computer readable program code means for cutting a packing material to conform to the packing configuration.

87. The computer program product of claim 86, further comprising sixth computer readable program code means for storing the set of outlines.

88. The computer program product of claim 86, further comprising seventh computer readable program code means for storing the packing configuration.

89. The computer program product of claim 86, wherein the fifth computer readable program code means includes eighth computer readable program code means for converting the packing configuration to a machine readable form.

90. The computer program product of claim 89, wherein the fifth computer readable program code means further includes ninth computer readable program code means for controlling a cutting machine guided by the machine readable form.

91. The computer program product of claim 86, further comprising tenth computer readable program code for raster-to-vector conversion.

92. The computer program product of claim 86, further comprising eleventh computer readable program code means for editing the set of outlines.

93. The computer program product of claim 86, further comprising twelvth computer readable program code means for printing a label, the label being arranged to be included with a tool kit and being further arranged to display at least one outline of at least one tool for included in the tool kit.

94. The computer program product of claim 86, further comprising thirteenth computer readable program code means for logging a tool kit.

95. The computer program product of claim 86, further comprising fourteenth computer readable program code means for tracking a tool kit.

96. The computer program product of claim 86, further comprising fifteenth computer readable program code means for preparing reports.

97. A system for managing tool kit inventory and assembly for a plurality of tool kits, the system comprising:

a means for providing a raster image of an item;

a means for receiving the secured raster image and determining an outline of the raster image;

a means for receiving the outline and converting the outline to a vector form; and a means for receiving the vector form outline and manufacturing a packing material to conform to the outline.

98. The system of claim 97, further comprising means for storing the set of outlines.

99. The system of claim 97, further comprising means for storing the packing configuration.

100. The system of claim 97, further comprising means for logging the tool kit.

101. The system of claim 97, further comprising means for tracking the tool kit.

102. The system of claim 97, further comprising means for converting the packing configuration to a machine readable form.

103. The system of claim 97, further comprising means for raster-to-vector conversion.

104. The system of claim 97, further comprising means for converting the set of outlines to a machine readable form.

105. The system of claim 104, wherein the means for cutting includes means for controlling the cutting responsive to the machine readable form.

106. The system of claim 97, further comprising means for sizing the set of outlines to conform to actual sizes of the plurality of tools.

107. The system of claim 97, further comprising means for editing the set of outlines to add at least one cutout space, the cutout space being configured to aid in placing or removing a tool from the packing material.

108. The system of claim 97, further comprising means for outputting a label, the label being arranged to be included with the tool kit and being further arranged to display at least one outline.

109. The system of claim 97, further comprising means for preparing at least one report.

110. The system of claim 97, further comprising means for editing the packing configuration.

* * * * *